INVENTOR.
JURIJ KARPINSKY
BY
ATTORNEY

United States Patent Office 3,296,533
Patented Jan. 3, 1967

3,296,533
METHOD AND APPARATUS FOR MEASURING THE INTENSITY OF THE MAGNETIC COMPONENT OF WEAK ELECTROMAGNETIC FIELDS OF RADIO FREQUENCIES
Jurij Karpinsky, Prague, Czechoslovakia, assignor to Ceskoslovenska akademie ved, Prague, Czechoslovakia, a corporation of Czechoslovakia
Filed Apr. 19, 1965, Ser. No. 449,182
Claims priority, application Czechoslovakia, Jan. 12, 1960, 277/60
6 Claims. (Cl. 325—363)

This application is a continuation-in-part of my copending patent application Serial No. 81,001, filed on January 6, 1961, for which the benefit of the filing date of January 12, 1960 of my Czechoslovakia patent application No. 277/60 has been claimed.

My invention relates to a method of measuring the intensity of the magnetic component of weak electromagnetic fields of radio frequencies by means of a loop antenna. It may be applied, for instance, to assist in the improvement of transmitting devices by providing an improved manner of testing field strengths, and it also may be used for measurements in radio-prospecting for minerals and ores.

When measuring the intensity of the magnetic component of weak electromagnetic fields by means of a loop antenna the induced electromotive force is usually determined either (a) By the substitution method, in which a standard voltage of a known value is introduced into the loop in a series-connection, or (b) By measuring the voltage on a tuned loop or a part thereof, said voltage being proportional to the quality factor Q of the circuit formed by the tuning condenser and the loop antenna. In such case the measuring operation is effected by means of a selective microvoltmeter-receiver which is calibrated in voltage values at the input terminals of the receiver.

A common drawback of both aforesaid known methods is the dependence of the induced electromotive force upon the frequency of the measured H.F. field and in the second case additionally upon the quality factor Q of the loop. When proceeding according to method (b) the above two factors require coefficients to be used in the process of measuring the field intensity, said coefficients being dependent upon the frequency and expressed in the form of a calibration curve. Possible changes in the quality factor of the loop may give rise to errors in the course of the intensity measurement.

There are other direct or indirect measuring methods known; for example the current in the antenna may be measured by a milliammeter which, however, disadvantageously loads or influences the antenna therefore requiring corrections of the indications.

A substitution method, in which at the measuring place a known field of such intensity is created that the voltage induced in the antenna and the current generated thereby are the same as in the measured field, is cumbersome and is not applicable if the measured field interferes constantly and cannot be eliminated. Other methods, wherein the tuning and the attenuation of the antenna is gradually changed and the intensity of the measured field calculated from the measured values, are burdensome and time consuming.

The object of my invention is to eliminate the disadvantages of the known inaccurate measuring methods and to provide a simple and easy method for measuring a high-frequency field by ascertaining its magnetic component. Another object of my invention is to eliminate any dependence of the measuring method on the frequency of the field and to a great extent of the tuning of the antenna by the capacitor.

My new method for measuring the intensity of the magnetic component of weak electromagnetic fields is based on the theory of equivalent current source according to Norton's theorem. Every loop antenna excited by the magnetic component of a high-frequency electromagnetic field may be theoretically represented by a Norton's equivalent current source.

My new method comprises the following steps: coupling the loop antenna in parallel with an A.C. voltmeter and a calibrating signal generator having a known calibrating Norton equivalent current; measuring between terminals of said parallel connected elements the A.C. voltage over the total admittance resulting from the calibrating signal generator; said total admittance remaining unchanged by both measurements; and ascertaining the intensity of the field from the measured voltages ratio at the known calibrating Norton equivalent current of the calibrating signal generator, the known properties of the loop antenna and their coupling.

The said and other objects of my invention will be more fully understood from the following specification when read with the accompanying drawing in which FIG. 1 illustrates the relation between the measured field and the short-circuit current of the loop antenna;

Figure 1:
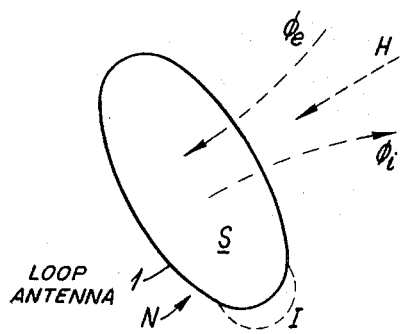

The theoretical fundamentals of the method will now be described with reference to FIGS. 1, 2 and 3. The loop antenna 1, having an area S and N turns, is placed in a space where it is acted upon by an electromagnetic field of a radio frequency, the value of the magnetic field component perpendicular to the antenna area being H. The end of the Nth turn is connected to the beginning of the first turn, i.e. the antenna is short-circuited. Be it assumed, that the resistance of the wire of which the antenna is made, is negligible. A current I is induced by the outer field in the conductor, said current I producing its own (secondary) field. Because in an ideal short-circuited conductor the resulting electromotive force must be zero, it follows that the flux $\phi_i$ passing through the loop antenna and produced by the induced current, must be equal to the flux $\phi_e$ of the outer field and must have an opposite sense.

For $\phi_e$ and $\phi_i$ the following relations will apply:

$$\phi_e = \phi_i \quad (1)$$

$$\phi_e = \mu_0 H S \quad (2)$$

$$\phi_i = \frac{LI}{N} \quad (3)$$

wherein $\mu_0$ is the permeability of vacuum (equal to $4\pi \cdot 10^{-7} H/m$) and L is the inductance of the antenna 1. From the Relations 1, 2, 3 follows the relation between the field intensity H and the short-circuit current I;

$$I = \frac{\mu_0 N S}{L} H \quad (4)$$

The constant of proportionality in this relation depends only on the geometrical dimensions of the loop antenna 1 (including inductance L) and is independent, which will be seen to be an important feature, upon the frequency of the electromagnetic field, insofar as the inner inductance of the conductor caused by the magnetic field inside the conductor can be neglected.

Figure 2:
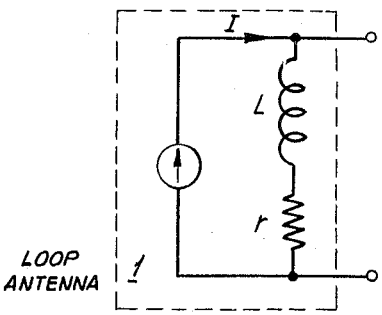
FIG. 2 illustrates the Norton equivalent circuit of the loop antenna including a constant current generator.

If the closed conductor of the antenna 1 in FIG. 1 is disconnected at any desired point, a source of electric power is obtained having between its terminals an impedance $Z=jL+r$ and a short-circuit current I according to Equation 4. Therefore we may represent the antenna 1 in accordance with Norton's theorem as an equivalent current source consisting of an ideal source of constant current I connected in parallel with impedance Z of the antenna having inductance L and in series with resistance r; the constant current I, generated by the ideal constant current generator, is given by the Equation 4 too. The value of this constant current is equal to that of the real short circuit current of the loop 1 under action of the electromagnetic field of the intensity H. In the following description this current will be named "Norton equivalent current."

It is evident, that the quality factor Q of the antenna being sufficiently high, the influence of the loss resistance r on the Norton equivalent current can be neglected.

If we can ascertain the current I in the antenna 1 placed into the unknown high-frequency field, then we can ascertain the intensity H of the magnetic component of said field which is perpendicular to the area S of the loop antenna 1. As the value I of the real short circuited current equals Norton's equivalent current of the constant current generator of the antenna, this value I can be ascertained by ascertaining the value of Norton's equivalent current.

Figure 3:
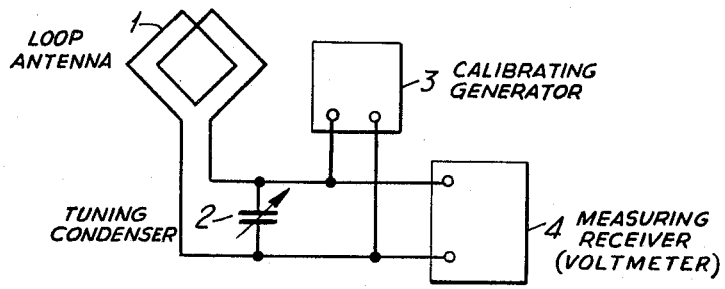
FIG. 3 illustrates diagrammatically in principle the wiring used in the application of the method.

According to my invention as illustrated in FIG. 3, the value of the short circuit current I in the antenna can be indirectly stated, whereby the impedance of the circuit closed to the loop-antenna terminals can be matched without limitation to the inner impedance of the antenna, the knowledge of the exact value of the impedance of said circuit not being necessary for the evaluation of the measurement and said possibility of matching being advantageous for weak fields measurements. Connected in parallel to the antenna 1 are a tuning condenser 2, a calibrating generator 3 and a high-frequency millivoltmeter (receiver) 4.

Figure 4:
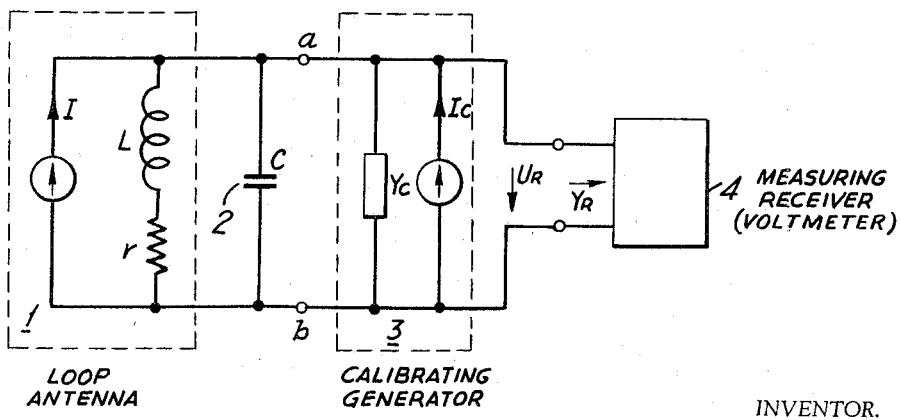
FIG. 4 shows the equivalent circuit of the wiring of FIG. 3, on which the method of measuring the intensity of weak electromagnetic fields is based.

In the diagram of FIG. 4 the antenna 1 and the calibrating generator 3 are shown as equivalent current sources. The inner admittance $Y_C$ and Norton's equivalent current $I_C$ of the calibrating generator are initially known being ascertainable from measured values of the open-circuit voltage and of the output admittance. The inner admittance of the antenna 1, given by inductance L and inner resistance r in series has the value $Y_A$, the admittance of condenser 2 the value $Y_K$ and the input admittance of the high-frequency millivoltmeter (receiver) 4 the value $Y_R$. The overall admittance between the points a and b in FIG. 4, namely $$Y = Y_A + Y_K + Y_C + Y_R \qquad (6)$$

remains constant.

If the antenna is influenced by an electromagnetic field of intensity H, its Norton equivalent current I causes on the overall admittance Y a voltage drop of the amplitude $$|U_A| = \frac{|I|}{|Y|} \qquad (7)$$

Norton's equivalent current $I_C$ of the calibrating generator 3 causes on the overall admittance Y a voltage drop of the amplitude $$|U_C| = \frac{|I_C|}{|Y|} \qquad (8)$$

and from Equations 7 and 8 results $$|I| = |I_C| \frac{|U_A|}{|U_C|} \qquad (9)$$

Norton's equivalent current $I_C$ of the calibrating generator 3 is known and hereinafter it will be defined as "calibrating Norton's equivalent current." The voltage ratio $|U_A|:|U_C|$ may be measured by the high frequency millivoltmeter (receiver) 4 provided that $I_C = 0$ while measuring $U_A$ and $I=0$ or $I \ll I_C$ while measuring $U_C$. The condition $I_C = 0$ can be achieved for example by switching off the feed or excitation of the end stage of the calibrating generator 3; this does not change its output inner admittance $Y_C$ and neither the overall admittance Y. The condition $I = 0$ can be attained by switching off the source of the measured field i.e. the sender, or by turning the loop antenna 1 with its position of minimal receiving, provided the antenna in such position is not influenced by another high-frequency electromagnetic field of approximately the same frequency. This condition however, will seldom be achieved. Therefore, for a sufficiently precise measurement the condition $I \ll I_C$ will be sufficient and this will not be difficult because the voltage of calibrating generator 3 can be increased at will within wide limits.

From Equations 4 and 9 results $$|H| = |I_C| \frac{|U_A|}{|U_C|} \frac{L}{\mu_0 N S} \qquad (10)$$

It is apparent from the foregoing that the measurement is independent of the admittance Y, i.e. of the quality factor of the loop 1, its correct tuning and the input admittance of the receiver 4. The tuning of the loop antenna with the condenser 2 is not essential but it is advantageous for reducing the noise factor and for suppression of interfering strong local fields of other frequencies.

In some cases it is indispensable to use a balanced connection of the loop in addition to the screening, in order to suppress electrostatic voltage induction in the antenna. If the wiring scheme according to FIG. 4 is applied, the calibrating signal generator 3 would have to be balanced too. In the following paragraphs it will be explained that the value of the Norton equivalent current I can be determined indirectly even by measurements carried out on any required two taps on the induction or capacity branch of the loop. This permits, for example, the connecting of a balanced loop to an unbalanced receiver input and unbalanced calibrating signal generator. An impedance matching is also possible.

Figure 5:
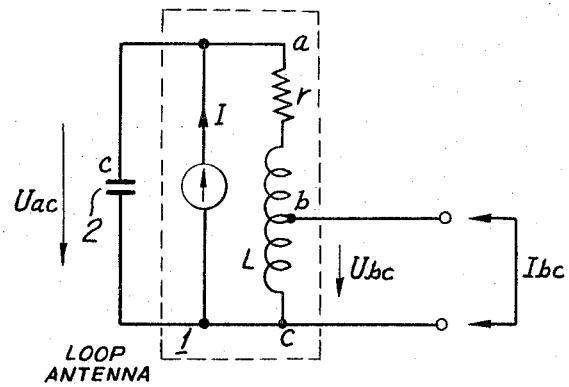
FIG. 5 illustrates the determination of the field intensity by measurement and calibration at any two taps of an approximately tuned loop.

FIG. 5 represents diagrammatically a loop antenna 1 in the form of a coil having an inductance L and loss resistance r, fed by the Norton equivalent current I, the value of which is given by the Equation 4. Connected in parallel to the coil is a tuning condenser 2 having a capacity C. The produced resonance circuit has between points a, c an impedance $Z_{ac}$, which, in general, is not real, when the circuit is detuned. A tap is provided on the loop at point b in such a way that the voltage between points b, c is transformed in the ratio n:1. If the quality factor of the circuit is not too low and if the circuit is not excessively detuned (the detuning being comparable with the bandwidth of the tuned loop) the impedances are transformed, as is well known, in a ratio of $n^2:1$. When there is no load in the terminals b, c the voltage is therefore $$U_{bc} = \frac{U_{ac}}{n} \qquad (11)$$

and the impedance between points b, c is $$Z_{bc} = \frac{Z_{ac}}{n^2} \qquad (12)$$

If the unit between points b, c is considered as active, the terminal network having an impedance $Z_{bc}$ and open circuit voltage $U_{bc}$, it will be appreciated that when its terminals are short-circuited it will yield a short-circuit current $$I_{bc} = \frac{U_{bc}}{Z_{bc}} \quad (13)$$

which is equal to the value of the Norton equivalent current in the corresponding Norton equivalent circuit, related to the terminals $b$, $c$.

Applying the relation $$U_{ac} = Z_{ac} I \quad (14)$$

and Equations 11, 12 and 13 we obtain $$I_{bc} = In \quad (15)$$

which means that the Norton equivalent current related to the taps $b$, $c$ is in a known relation to the Norton equivalent current $I$ defined by the Formula 4, the Relation 15 being independent of the quality factor and tuning of the loop as far as the respective values lie within limits, for which applies the transformation of voltages and impedances according to Equations 11 and 12.

Instead of Equation 9 the equation $$|I_{bc}| = |I_C| \frac{|U_A|}{|U_C|} \quad (9a)$$

applies and from Equations 4, 9a and 15 follows $$H = |I_C| \frac{1}{n} \frac{|U_A|}{|U_C|} \frac{L}{\mu_0 NS} \quad (10a)$$

Figure 6:
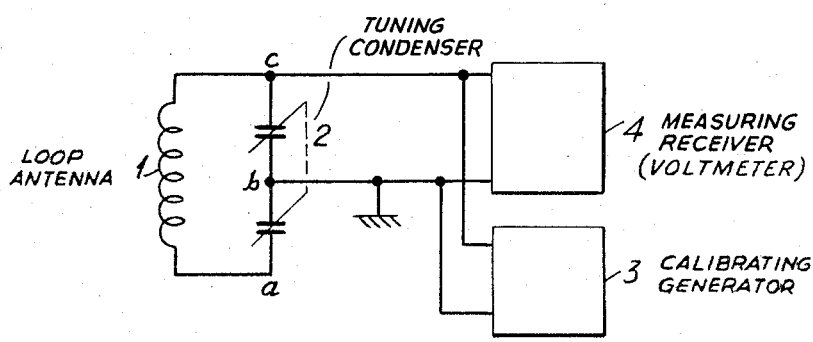
FIG. 6 is a similar illustration for taps provided in the capacity branch of an approximately tuned, symmetrically connected loop.

The above consideration applies likewise to any taps on the capacity branch of the circuit LC in FIG. 5. This capacity branch can be made as a condenser divider with a known dividing ratio. The parallel combination of the calibrating generator 3 and a receiver 4 can be connected to a part of said condenser divider. This condenser divider can be accomplished by fixed or variable capacitors. FIG. 6 shows a circuit in which the center of the capacity branch (point $b$) is grounded, so that of the tuned loop 1 (represented as an inductive coil) is balanced and the Norton equivalent current related to the points $b$, $c$, is measured. Connected to these points are again a measuring receiver 4 and a calibrating generator 3. The output impedance of the generator 3, which even during the measuring process is permanently connected to the circuit of the loop antenna 1, must not be too low, in order not to substantially impair the quality factor of the loop, not to reduce excessively the voltage value at the input receiver 4 and thus not to impair the sensivity of the whole device. Said impedance (reciprocal value of the admittance $Y_C$ in FIG. 4) need not, however, greatly exceed the impedance of the tuned loop between points $b$ and $c$, because the known Norton equivalent current $I_C$ in the equivalent circuit according to FIG. 4 is not the actual current supplied during calibration from the source 3, but a current the value of which equals the output current when the terminals of the source 3 are short-circuited.

Figure 7:
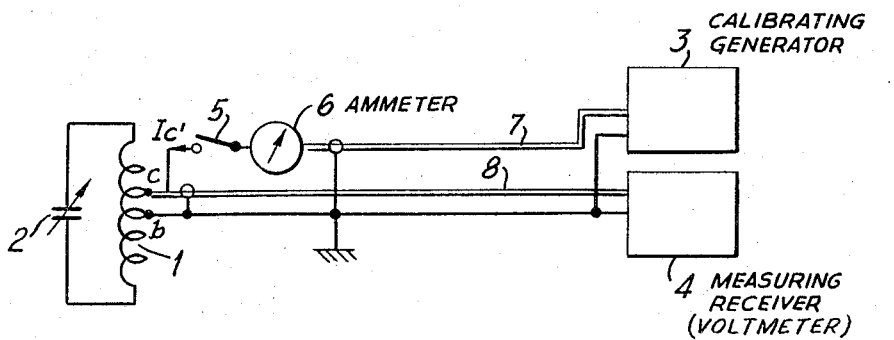
FIG. 7 shows an example of applying the invention in case the loop antenna is connected to the receiver through a long cable.

FIG. 7 shows a wiring diagram comprising a tuned loop antenna represented as inductive coil 1 connected with its two taps $b$, $c$ to the receiver itself by means of a cable 8. The calibrating generator 3 is connected to antenna 1 by cable 7 over the switch 5 and high-frequency milliammeter 6. Such connection imitates a calibrating generator 3 with zero output admittance $Y_C = 0$ i.e. an ideal current source. The overall admittance Y is comprised according to FIG. 7 of the admittance of antenna 1 and condenser 2 connected to points $b$, $c$, and the input admittance of the high frequency millivoltmeter (receiver) 4. In this case we need not know the calibrating current $I_C$ (Norton equivalent constant current) of the calibrating generator 3, and neither its output admittance $Y_C$. If the voltage $U_A$ is measured, the condition $I_C = 0$ is achieved by opening switch 5. If the voltage $U_C$ is measured, the condition of an unchanged overall admittance Y between points $b$, $c$ is achieved by closing switch 5, measuring the calibrating current $I_C$ actually flowing from generator 3 into admittance Y. This arrangement can preferably be used if the loop antenna cannot be rigidly connected to the remaining part of the field measuring apparatus. If the distance of the loop antenna 1 from the receiver 4 and calibration generator 3 is relatively great, the indication of the current measuring instrument 6, which must be in close vicinity of the loop antenna, can be telemetered from the place where the receiver is situated.

The disclosed methods of measuring the intensity of the magnetic component of weak electromagnetic fields by means of a loop antenna can be applied also to the measurement of high frequency magnetic fields, such as in cavity resonators, by means of loop-shaped sondes, which, to all practical purposes, are one winding loop antenna. If the loop is accommodated for instance in a coaxial cable then the Norton equivalent current is proportional to the passing magnetic flux and thus also to the current flowing through the coaxial conductor. The proportionality constant is independent from the frequency and is given merely by the geometrical arrangement of the loop. The method according to the invention can, therefore, be used also for the measurement of high-frequency currents.

Although specific embodiments of my invention have been shown and described in detail to illustrate the application of the principles thereof, it will be understood that numerous other arrangements may be devised by those skilled in the art without departing from the spirit and scope of my invention.

What I claim is:

1. A device for measuring the intensity of the magnetic component of weak electromagnetic field, said device comprising, in combination, a loop antenna having a known number of turns, a known loop area and known inductance; a condenser divider with a known dividing ratio connected permanently to the antenna; an A.C. voltmeter and a calibrating signal generator having a known Norton equivalent current connected permanently to the A.C. voltmeter; said parallel connection of said generator and voltmeter being connected to a part of said condenser divider.

2. A device for measuring the intensity of the magnetic component of weak electromagnetic field, said device comprising, in combination, a loop antenna having a known number of turns, a known loop area and known inductance, a tuning condenser connected permanently to the antenna; an A.C. voltmeter connected permanently to a part of the resonant circuit formed by the loop antenna and the tuning condenser coupled in parallel, the transformation or division factor of this connection being known; a calibrating generator; an A.C. ammeter and a switch connected in series to the output of the calibrating generator; the free terminals of said series connection of the A.C. ammeter and the switch with the calibrating generator connected to the A.C. voltmeter.

3. A device as claimed in claim 2 including first long cable connections between said A.C. voltmeter and the parts of the device and second long cable connection between the calibrating generator and other parts of the device.

4. A method for measuring the intensity of the magnetic component of weak electromagnetic fields with a loop antenna connected at least in part in parallel with the input of an A.C. voltage measuring device and with the output of a calibrating signal generator, the method comprising determining the calibrating Norton equivalent current of said signal generator, measuring with said A.C. voltage measuring device a first voltage due to the Norton equivalent current of said loop antenna acted upon by the measured field, measuring with said A.C. voltage measuring device a second voltage due to said calibrating Norton equivalent current, and determining the intensity of the measured field by utilizing said calibrating Norton equivalent current and the ratio of said first and second voltages.

5. The method of claim 4 and further comprising adjusting the output of said calibrating signal generator substantially to zero while measuring said first voltage, the magnitude of said calibrating Norton equivalent current being greater than the magnitude of the Norton equivalent current of said antenna while measuring said second voltage.

6. The method of claim 4 and further comprising maintaining a substantially constant total circuit admittance while measuring said first and second voltages.

References Cited by the Examiner

UNITED STATES PATENTS

| | | | |
|---|---|---|---|
| 1,647,349 | 11/1927 | Friis | 325—67 |
| 1,748,659 | 2/1930 | Sundberg | 324—47 X |
| 1,982,331 | 11/1934 | Taylor | 325—67 |

KATHLEEN H. CLAFFY, *Primary Examiner.*

R. S. BELL, *Assistant Examiner.*